J. F. Nicholson.
Harvester Cutter.
Nº 12888          Patented May 15, 1855.
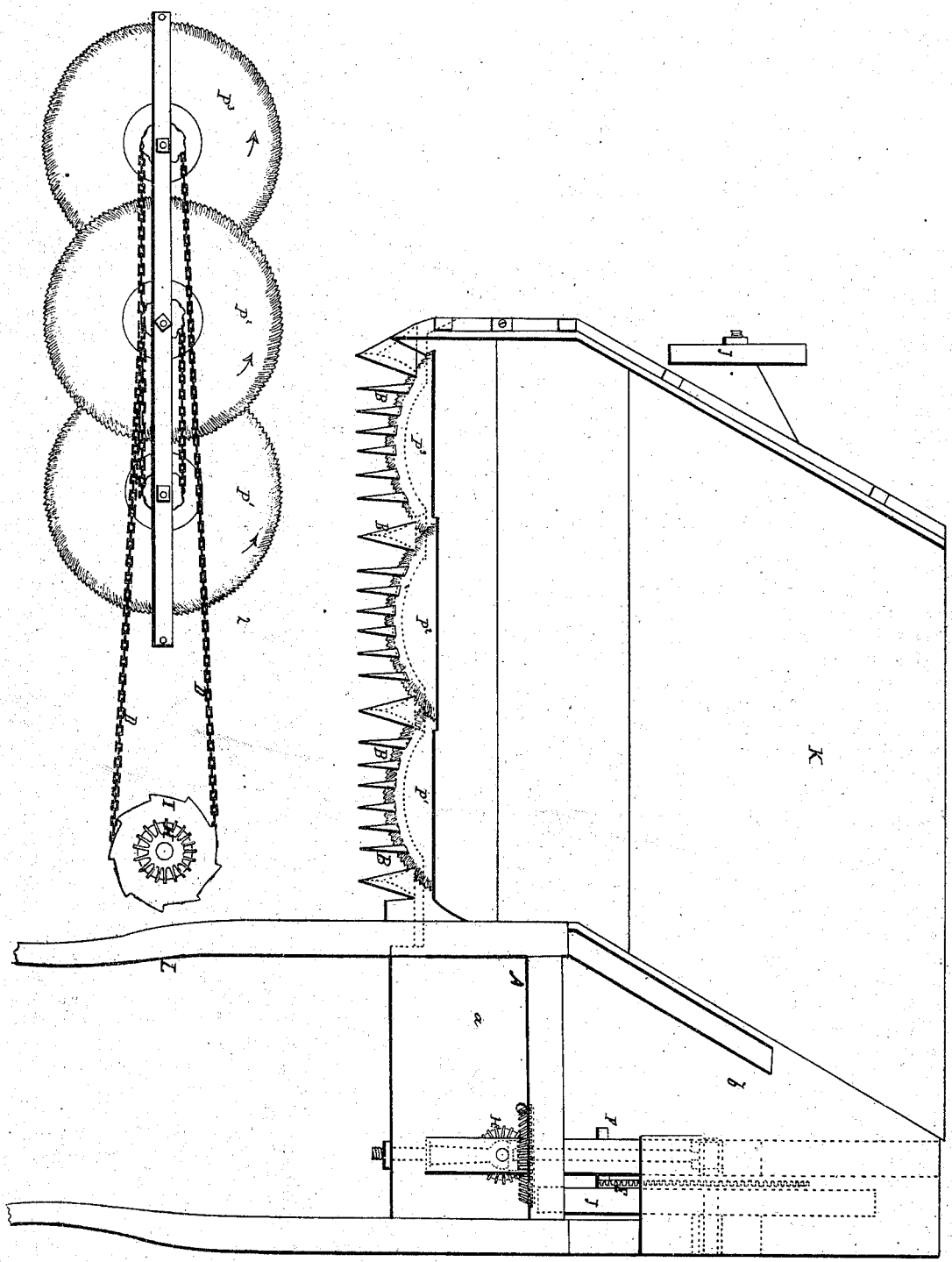

UNITED STATES PATENT OFFICE.

JOHN F. NICHOLSON, OF DAVIDSONVILLE, MARYLAND; BENJ. S. NICHOLSON ADMINISTRATOR OF SAID JOHN F. NICHOLSON, DECEASED.

IMPROVEMENT IN GRAIN-HARVESTERS.

Specification forming part of Letters Patent No. 12,888, dated May 15, 1855.

*To all whom it may concern:*

Be it known that I, JOHN F. NICHOLSON, of Davidsonville, in the county of Anne Arundel and State of Maryland, have invented a new and useful improvement in the machine for cutting grain, called "Nicholson's Improved Reaping-Machine," which is described as follows, reference being had to the annexed drawings of the same, making part of this specification.

Figure 1 is a top or bird's-eye view of the machine. Fig. 2 is a top view of the sickle-edged plates P' P² P³, endless chain D, and pulleys C, C, C, and I. Fig. 3 is a section of a revolving plate which may be substituted for those represented as applied to the machine.

Similar letters refer to corresponding parts in the different figures.

This machine consists of a frame, A, of suitable size, strength, and material for the purpose intended, having at each end a wheel which turns upon the ground and sustains the machine at a suitable distance therefrom. A series of wrought-iron fingers, B, are secured to the lower front transverse timber of the frame by means of segment-plates, behind which are arranged three or more horizontal revolving disks or circular plates, P' P² P³, with sickle-edges or bill-hook teeth, or otherwise formed for cutting the grain, each being secured to a vertical axle which passes through the centers of the same and turns in gudgeons and steps secured to the frame. A grooved pulley, C, made rough on its periphery, is secured on each of these axles a short distance above the circular plates, around which passes an endless chain or band, D, for giving the required motion to the sickle-edged plates.

On the inside of the main driving-wheel J is secured a bevel-cogged wheel, E, which meshes in gear with another cogged wheel, F, secured on a horizontal longitudinal shaft turning in boxes attached to the frame. Another bevel-cogged wheel, G, larger than the last mentioned, is fixed on this shaft near the opposite end of the same, which meshes in gear with a bevel-wheel, H, fixed on a vertical shaft turning in a step secured to the front transverse timber On this last-mentioned shaft, and near the lower edge of the same, is secured a grooved pulley, I, made rough on its periphery. An endless chain or band, D, passes around this last-mentioned pulley, and from thence around the grooved pulley attached to the outside revolving disk or sickle-edged plate, P³, thence around the pulley secured to the inside revolving plate, P', thence around the middle sickle-edged plate, P², and thence around the first or main driving-pulley I.

The space K, through which the grain passes after being cut, extends obliquely to the back corner of the frame, immediately behind the shafts for the animal to draw the machine by. By this means the grain is deposited on the ground behind the machine and in a line out of the track of the horse in his return.

Another kind of wheel (represented in Fig. 3) may be substituted for the sickle-edged plates. This wheel is made of the same material as the sickle-edged plates, and has six or more sickle or sharp edged bill-hook teeth formed on its periphery. This wheel may be arranged and propelled in a similar manner to those represented as applied to the machine.

The machine is provided with a pair of shafts, L, for the animal to draw by and a place, *a*, for the driver to sit in, and a suitable raker's stand or seat, *b*.

The space K, through which the cut grain passes, being in the form of a rhombus and the raking oblique, the operator is enabled to guide and deposit the grain in a line out of the track of the animal in his return.

What I claim as my invention, and what I desire to secure by Letters Patent, is—

Making the space through which the grain passes in the form of a rhombus, for the purpose of depositing the grain in a line out of the track of the horse, as described.

JOHN F. NICHOLSON.

Witnesses:
 EDM. MAHER,
 ALBERT E. JOHNSON.